US009647492B2

United States Patent
Lin et al.

(10) Patent No.: US 9,647,492 B2
(45) Date of Patent: May 9, 2017

(54) DIRECT CURRENT UNINTERRUPTIBLE POWER SUPPLY SYSTEM AND DEVICE

(71) Applicants: LITE-ON ELECTRONICS (GUANGZHOU) LIMITED, Guangzhou (CN); LITE-ON TECHNOLOGY CORP., Taipei (TW)

(72) Inventors: Liang-Chun Lin, Taipei (TW); Yi-Nan Lai, Taipei (TW); Wei-Lieh Lai, Taipei (TW); Ming-Wang Cheng, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 678 days.

(21) Appl. No.: 14/246,379

(22) Filed: Apr. 7, 2014

(65) Prior Publication Data
US 2015/0021989 A1    Jan. 22, 2015

(30) Foreign Application Priority Data
Jul. 22, 2013 (CN) .......................... 2013 1 0309809

(51) Int. Cl.
H02J 7/00 (2006.01)
H02J 9/06 (2006.01)

(52) U.S. Cl.
CPC ................ H02J 9/06 (2013.01); H02J 9/061 (2013.01); H02J 2009/068 (2013.01); Y10T 307/344 (2015.04); Y10T 307/625 (2015.04)

(58) Field of Classification Search
CPC ........ H02J 9/06; H02J 2009/068; G01R 31/40
USPC ........... 307/48, 43, 66, 23, 64, 125; 320/134
See application file for complete search history.

(56) References Cited

U.S. PATENT DOCUMENTS

2015/0021989 A1*  1/2015  Lin .......................... H02J 9/06
                                                               307/23

* cited by examiner

*Primary Examiner* — Arnold Kinkead
(74) *Attorney, Agent, or Firm* — Rosenberg, Klein & Lee

(57) ABSTRACT

A DC uninterruptible power supply system includes plural uninterruptible power supply devices, each of which includes a power cord, a battery module, a voltage detecting circuit, a current detecting circuit, and a control unit. When the voltage detecting circuit detects that a voltage at the power cord is lower than a first preset value, the control unit controls the battery module to output electrical power to the power cord. When the current detecting circuit detects that current of another uninterruptible power supply device is smaller than a second preset value, the control unit controls a switch to permit current flow to the another uninterruptible power supply device.

12 Claims, 4 Drawing Sheets

DIRECT CURRENT UNINTERRUPTIBLE POWER SUPPLY SYSTEM AND DEVICE

CROSS-REFERENCE TO RELATED APPLICATION

This application claims priority to Chinese Application No. 201310309809.8, filed on Jul. 22, 2013.

BACKGROUND OF THE INVENTION

1. Field of the Invention

The invention relates to an uninterruptible power supply system and device, and more particularly to a direct-current uninterruptible power supply system and device of a direct-current power source.

2. Description of the Related Art

Referring to FIG. 1, a conventional uninterruptible power supply device 1 includes a voltage distribution unit 11 that converts electrical power from a three-phase alternating-current (AC) power source 300 to single-phase electrical power, and a power supply unit 13 that converts the single-phase electrical power provided by the voltage distribution unit 11 to direct-current (DC) electrical power. The DC electrical power outputted by the power supply unit 13 is provided to a server 200, and also to a charging circuit 31 that converts the DC electrical power to a rating voltage of a battery 33 for charging the battery 33. The battery 33 is coupled to a transformer module 35. A switch 37 is coupled between the transformer module 35 and the server 200 and is controlled by the power supply unit 13. When the AC power source 300 stops output of electrical power, the power supply unit 13 controls the switch 37 to make electrical connection between the transformer module 35 and the server 200, so that the battery 33 outputs electrical power that is subsequently converted by the transformer module 35 to DC electrical power required by the server 200. The converted DC electrical power is then provided to the server 200 through the switch 37, thus achieving uninterrupted power supply.

However, the conventional uninterruptible power supply device 1 is only suitable for a single load, and cannot be connected to another uninterruptible power supply device, so that the load of the another uninterruptible power supply device cannot obtain additional electrical power when required. Furthermore, the transformer module 35 of the conventional uninterruptible power supply device 1 is usually implemented using a switching DC-DC converter, which is relatively complicated and has a relatively large size, making it difficult to reduce the size of the uninterruptible power supply device 1, and thus disfavoring application to electronic products that tend to have a light weight and a small size.

SUMMARY OF THE INVENTION

Therefore, an object of the present invention is to provide a DC uninterruptible power supply system that includes a plurality of DC uninterruptible power supply devices which may serve as backup power sources for each other, so that each of the DC uninterruptible power supply devices may promptly provide electrical power to another DC uninterruptible power supply device coupled thereto when required.

According to one aspect of the present invention, a direct-current (DC) uninterruptible power supply system comprises a plurality of uninterruptible power supply devices, each of which is disposed to receive input from a DC power source for supply of electrical power to a load, and includes:

a power cord to be coupled between the load and the DC power source for transmitting a first current from the DC power source to the load;

a battery module coupled to the power cord for receiving and storing electrical power from the DC power source;

a voltage detecting circuit coupled to the power cord and configured to generate a first trigger signal upon detecting that a voltage of the DC power source is lower than a first preset value;

a current detecting circuit coupled to the power cord of another one of the uninterruptible power supply devices, and configured to generate a second trigger signal upon detecting that the first current flowing in the power cord of the another one of the uninterruptible power supply devices is smaller than a second preset value;

a switch coupled between the power cord and the current detecting circuit, and configured to make or break electrical connection between the power cord and the current detecting circuit; and a control unit coupled to the battery module, the voltage detecting circuit, the current detecting circuit and the switch, and configured to control the battery module to output electrical power to the power cord according to the first trigger signal, and to control the switch to make electrical connection between the power cord and the current detecting circuit according to the second trigger signal.

Another object of the present invention is to provide a DC uninterruptible power supply device that may have a relatively small size and a relatively quick response.

According to another aspect of the present invention, a direct-current (DC) uninterruptible power supply device is disposed to receive input from a DC power source for supply of electrical power to a load, and comprises:

a power cord to be coupled between the load and the DC power source for transmitting a first current from the DC power source to the load;

a battery module coupled to the power cord for receiving and storing electrical power from the DC power source;

a voltage detecting circuit coupled to the power cord and configured to generate a first trigger signal upon detecting that a voltage of the DC power source is lower than a first preset value;

a current detecting circuit to be coupled to an external power cord and configured to generate a second trigger signal upon detecting that a current flowing in the external power cord is smaller than a second preset value;

a power-cord switch coupled between the power cord and the current detecting circuit, and configured to make or break electrical connection between the power cord and the current detecting circuit; and a control unit coupled to the battery module, the voltage detecting circuit, the current detecting circuit and the power-cord switch, and configured to control the battery module to output electrical power to the power cord according to the first trigger signal, and to control the power-cord switch to make electrical connection between the power cord and the current detecting circuit according to the second trigger signal.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
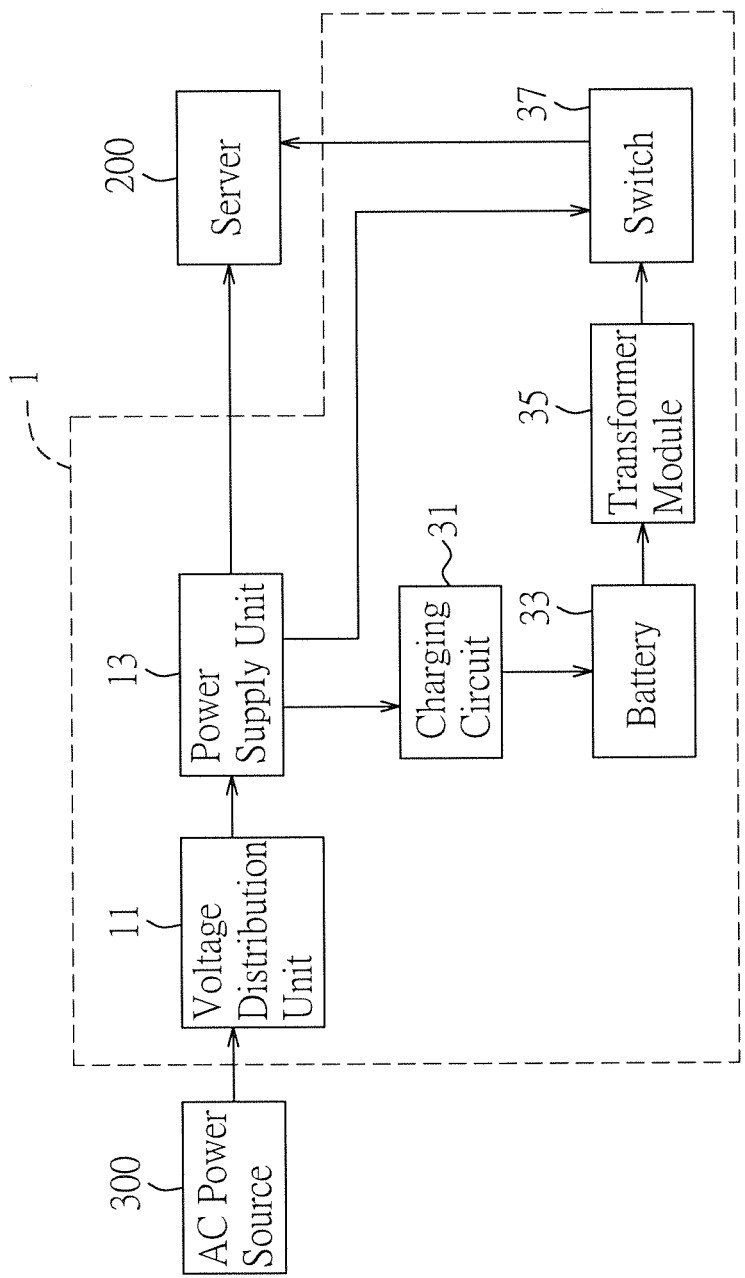
FIG. 1 is a circuit block diagram illustrating a conventional uninterruptible power supply device.
Figure 2:
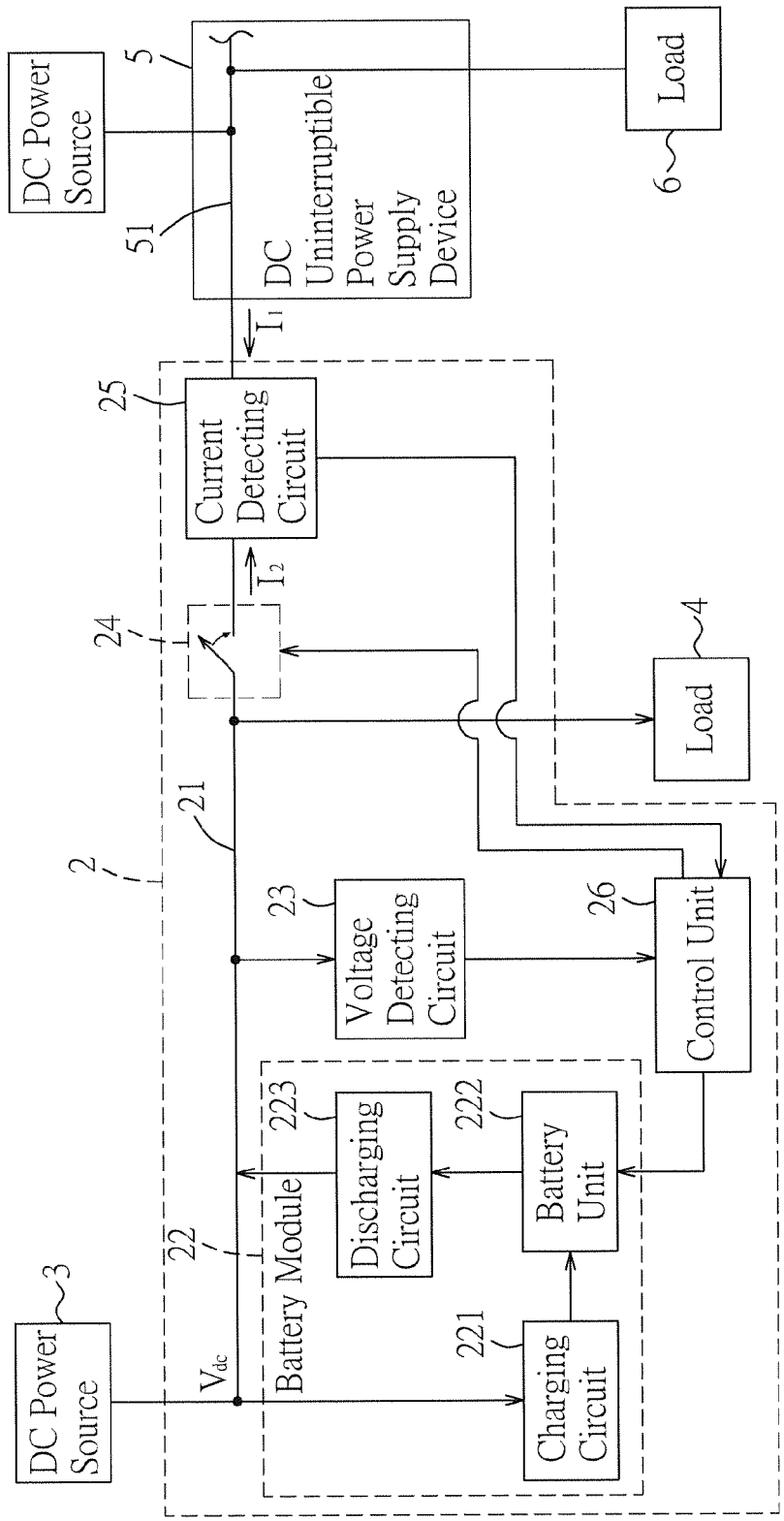
FIG. 2 is a circuit block diagram illustrating a preferred embodiment of a direct-current (DC) uninterruptible power supply device according to the present invention.

Referring to FIG. 2, the preferred embodiment of the direct-current (DC) uninterruptible power supply device 2 according to this invention is shown to receive input from a DC power source 3 for supply of electrical power to a load 4, and is adapted to be coupled to another DC uninterruptible power supply device 5. The DC uninterruptible power supply device 2 includes a power cord 21, a battery module 22, a voltage detecting circuit 23, a power-cord switch 24, a current detecting circuit 25 and a control unit 26. The power cord 21 is coupled between the load 4 and the DC power source 3 for supply of electrical power from the DC power source 3 to the load 4. In this embodiment, the load 4 may be any kind of electronic device or electronic equipment that uses DC electrical power, such as a notebook computer, a server, etc. In the implementation shown in FIG. 2, the DC uninterruptible power supply device 5 and the DC uninterruptible power supply device 2 of the preferred embodiment have an identical circuit configuration, and the current detecting circuit 25 is designed to be coupled between the power cord 21 and a power cord 51 of the DC uninterruptible power supply device 5 through the power-cord switch 24. The power-cord switch 24 is coupled between the power cord 21 and the current detecting circuit 25, and is controlled by the control unit 26 to make or break electrical connection between the current detecting circuit 25 and the power cord 21.

The battery module 22 is coupled to the power cord 21 for receiving and storing electrical power from the DC power source 3, and includes a charging circuit 221, a battery unit 222 and a discharging circuit 223. The charging circuit 221 is coupled between the power cord 21 and the battery unit 222 for receiving electrical power from the DC power source 3 and charging the battery unit 222. The battery unit 222 may be implemented using conventional rechargeable batteries coupled in series, in parallel, or in series-parallel, where the conventional rechargeable batteries may be Li-ion batteries, NiMH batteries, NiCd batteries, lead-acid batteries, etc. The discharging circuit 223 is used for adjusting a voltage outputted by the battery unit 222 to have a magnitude substantially the same as that of a voltage Vdc from the DC power source 3 (i.e., a voltage required by the load 4).

The voltage detecting circuit 23 is coupled to the power cord 21 for detecting the voltage Vdc of the DC power source 3, and generates a first trigger signal upon detecting that the voltage Vdc of the DC power source 3 is lower than a first preset value. The current detecting circuit 25, which is coupled between the power-cord switch 24 and the power cord 51 of the DC uninterruptible power supply device 5, detects a first current $I_1$ flowing in the power cord 51 of the DC uninterruptible power supply device 5, and generates a second trigger signal upon detecting that the first current $I_1$ is smaller than a second preset value. The control unit 26 is coupled to the battery module 22, the voltage detecting circuit 23, the current detecting circuit 25 and the power-cord switch 24, and controls the battery module 22 to output electrical power to the power cord 21 according to the first trigger signal, and controls the power-cord switch 24 to make electrical connection between the power cord 21 and the current detecting circuit 25 according to the second trigger signal.

Therefore, when the control unit 26 receives the first trigger signal from the voltage detecting circuit 23, which represents abnormal supply of electrical power by the DC power source 3 (e.g., cease of power supply or unstable power supply), the control unit 26 controls the battery module 22 to output electrical power to the power cord 21 for the load 4, thereby achieving uninterrupted power supply to the load 4.

When supply of electrical power by the DC power source 3 is normal and the control unit 26 receives the second trigger signal from the current detecting circuit 25, which represents that the DC uninterruptible power supply device 5 is unable to supply power normally, the control unit 26 immediately controls the power-cord switch 24 to make electrical connection between the power cord 21 and the current detecting circuit 25, so that the DC power source 3 may promptly supply electrical power to the load 6 that is coupled to the power cord 51 of the DC uninterruptible power supply device 5 via the power cord 21, the power-cord switch 24 and the current detecting circuit 25, thereby achieving uninterrupted power supply to the load 6 that is coupled to the DC uninterruptible power supply device 5. Even if electrical power is supplied by the battery module 22 due to abnormal power supply by the DC power source 3, the electrical power may also be provided to the load 6 that is coupled to the DC uninterruptible power supply device 5 through the power cord 21, the power-cord switch 24, and the current detecting circuit 25.

Furthermore, when the power-cord switch 24 makes electrical connection between the power cord 21 and the current detecting circuit 25, the current detecting circuit 25 generates a third trigger signal that is provided to the control unit 26 upon detecting a second current $I_2$ that flows in the power cord 21 from the DC uninterruptible power supply device 2 to the DC uninterruptible power supply device 5 (i.e., that flows through the power-cord switch 24) is greater than a third preset value (i.e., overcurrent), for example, when a short circuit occurs in the DC uninterruptible power supply device 5. The control unit 26 controls the power-cord switch 24 to break electrical connection between the power cord 21 and the current detecting circuit 25 according to the third trigger signal so as to prevent possible damage to circuits of the DC uninterruptible power supply device 2 from the overcurrent.

In addition, when the DC uninterruptible power supply device 5 is restored to normal supply of electrical power, and the current detecting circuit 25 detects that the first current $I_1$ flowing in the power cord 51 of the DC uninterruptible power supply device 5 reaches a fourth preset value, the control unit 26 controls the power-cord switch 24 to break electrical connection between the power cord 21 and the current detecting circuit 25 according to the fourth trigger signal so as to stop supply of electrical power to the DC uninterruptible power supply device 5.

Figure 3:
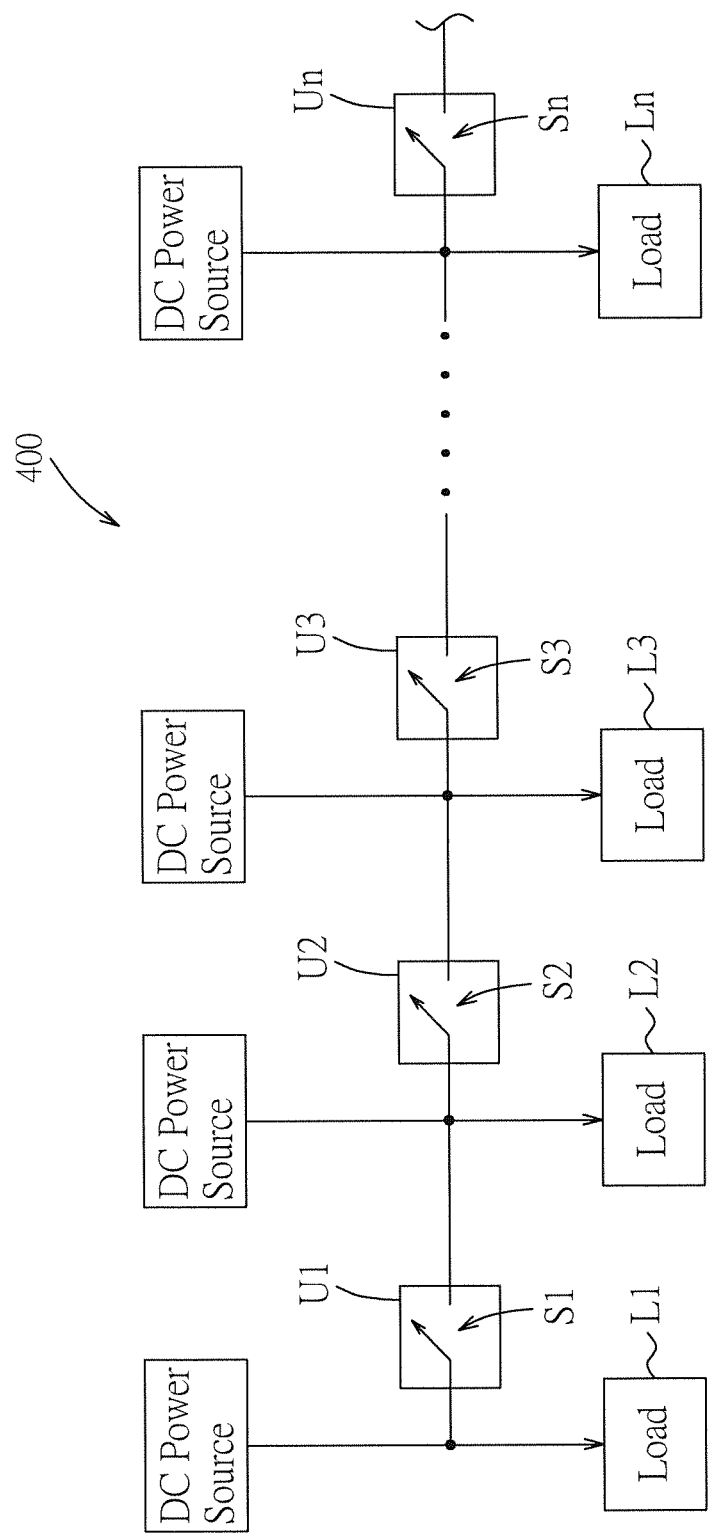
FIG. 3 is a schematic circuit diagram illustrating a DC uninterruptible power supply system that includes a plurality of the preferred embodiment of the DC uninterruptible power supply devices coupled together, which may mutually support each other when providing electrical power.

FIG. 3 shows a DC uninterruptible power supply system 400 that includes a plurality of the DC uninterruptible power supply devices U1~Un according to the preferred embodiment coupled in series through the power-cord switches S1~Sn thereof. When one of the DC uninterruptible power supply devices U1~Un, for example, the DC uninterruptible power supply device U3, is unable to normally provide electrical power to its load L3, the DC uninterruptible power supply device U2 may immediately detect such a condition, and control the power-cord switch 52 to make electrical connection between the power cords of the DC uninterruptible power supply devices U2 and U3, so as to supply electrical power promptly to the load L3 that is coupled to the DC uninterruptible power supply device U3. Similarly, when the DC uninterruptible power supply device U2 is unable to normally provide electrical power, the DC uninterruptible power supply device U1 may supply electrical power promptly to the DC uninterruptible power supply device U2, thereby achieving mutual support when providing electrical power.

Figure 4:
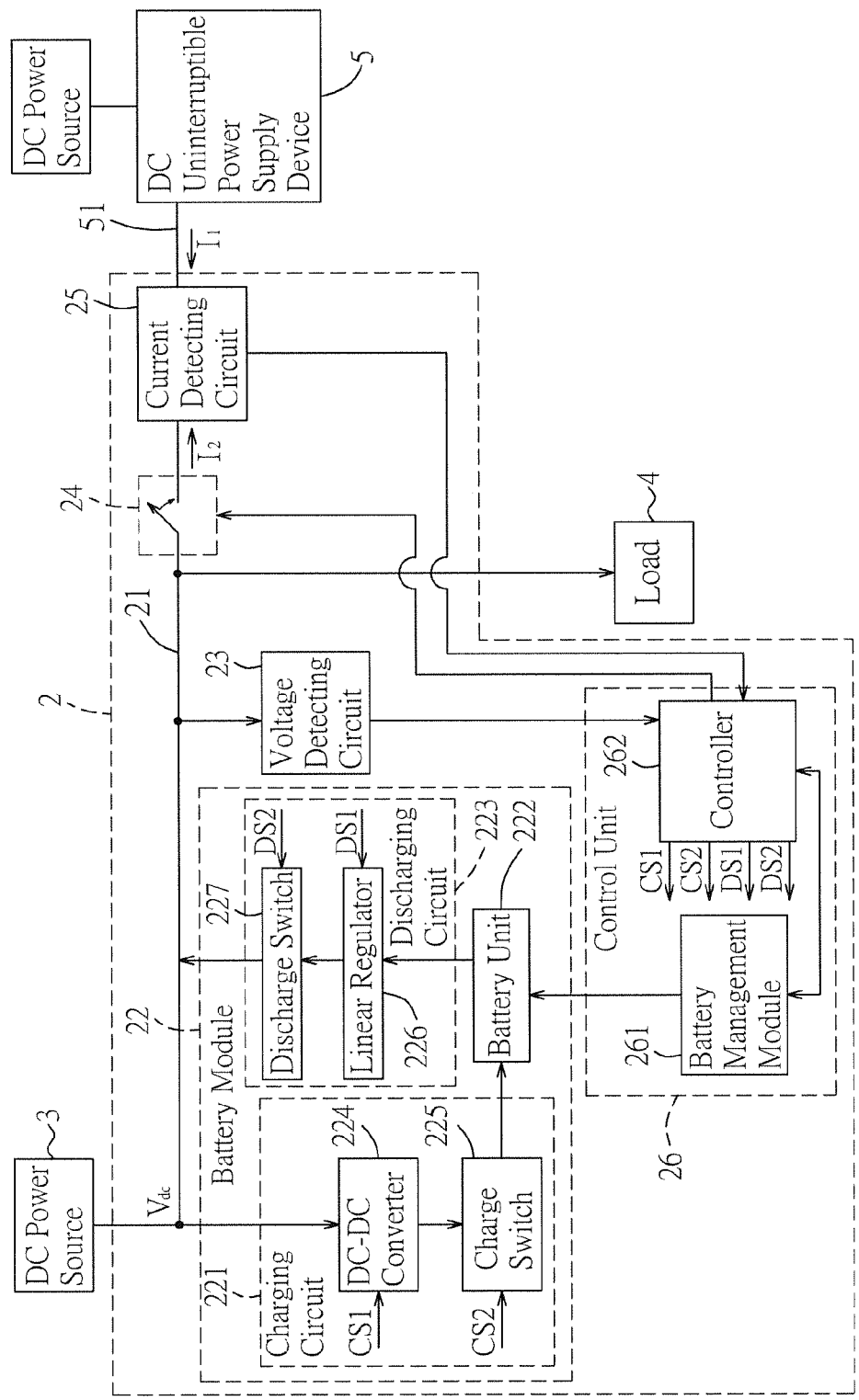
FIG. 4 is a circuit block diagram illustrating circuit blocks of the preferred embodiment of the DC uninterruptible power supply device in greater detail and linking relationships among the blocks.

FIG. 4 shows a detailed block diagram for the battery module 22 and the control unit 26 of the DC uninterruptible power supply device 2 of the preferred embodiment. The charging circuit 221 of the battery module 22 includes a DC-DC converter 224 coupled to the power cord 21 and a charge switch 225. The discharging circuit 227 includes a linear regulator 226 coupled to the battery unit 222, and a discharge switch 227 coupled between the linear regulator 226 and the power cord 21. The control unit 26 includes a battery management module 261 coupled to the battery unit 222, and a controller 262.

The DC-DC converter 224 is configured to convert the voltage Vdc from the DC voltage source 3 into a rating voltage of the battery unit 222, and to charge the battery unit 222 via the charge switch 225. The DC-DC convertor 224 and the charge switch 225 are respectively controlled using a first control signal CS1 and a second control signal CS2 outputted by the controller 262 of the control unit 26. For example, before receipt of the first trigger signal, the controller 262 controls the charging circuit 221 to charge the battery unit 222 until reaching full charge. After receipt of the first trigger signal, the controller 262 controls output of electrical power by the battery unit 222 via the battery management module 261 according to the first trigger signal. Since the DC power source 3 is unable to normally supply electrical power at this time, the controller 262 controls the charging circuit 221 to temporarily stop charging the battery unit 222 until the DC power source 3 is restored to normal supply of electrical power.

In addition, the controller 262 further outputs a third control signal DS1 and a fourth control signal DS2 to respectively control operations of the linear regulator 226 and the discharge switch 227, such that the linear regulator 226 applies a voltage drop to a voltage outputted by the battery unit 222 for outputting a voltage that has a magnitude suitable for the load 4 (i.e., substantially the same as that of the voltage Vdc from the DC power source 3), and outputs the voltage adjusted thereby to the power cord 21 via the discharge switch 227. For example, after receipt of the first trigger signal, the controller 262 controls the discharging circuit 223 to operate, so as to output a voltage having a magnitude that is the same as that of the DC power source 3 to the power cord 21 for the load 4 until the DC power source 3 is restored to normal supply of electrical power.

It should be noted that the linear regulator 226 of the discharging circuit 223 used in this embodiment is a low dropout (LDO) regulator, which has advantages such as a relatively quick response, low power consumption, a small size, low cost, etc., so as to reduce the size, power consumption, and cost of the DC uninterruptible power supply device 2, and to promote response speed of the discharging circuit 223 and the DC uninterruptible power supply device 2.

To sum up, by virtue of the power-cord switch 24 and the current detecting circuit 25 that are coupled between the power cord 21 and another DC uninterruptible power supply device 5 in this embodiment, the second trigger signal is generated when the current detecting circuit 25 detects abnormal power supply by the DC uninterruptible power supply device 5, so as to enable control of the power-cord switch 24 to make electrical connection between the power cord 21 and the current detecting circuit 25, thereby promptly supplying electrical power to the load 6 of the DC uninterruptible power supply device 5 via the power cord 21, and achieving mutual support when providing electrical power. Moreover, using the linear regulator 226 as a voltage drop converting circuit in the discharging circuit 223 may reduce an overall size, power consumption and cost of the DC uninterruptible power supply device 2, and may enhance response time performance of the discharging circuit 223 and the DC uninterruptible power supply device 2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A direct-current (DC) uninterruptible power supply system, comprising a plurality of uninterruptible power supply devices, each of which is disposed to receive input from a DC power source for supply of electrical power to a load, and includes:
    a power cord to be coupled between the load and the DC power source for transmitting a first current from the DC power source to the load;
    a battery module coupled to said power cord for receiving and storing electrical power from the DC power source;
    a voltage detecting circuit coupled to said power cord and configured to generate a first trigger signal upon detecting that a voltage of the DC power source is lower than a first preset value;
    a current detecting circuit coupled to said power cord of another one of said uninterruptible power supply devices, and configured to generate a second trigger signal upon detecting that the first current flowing in said power cord of said another one of said uninterruptible power supply devices is smaller than a second preset value;
    a switch coupled between said power cord and said current detecting circuit, and configured to make or break electrical connection between said power cord and said current detecting circuit; and
    a control unit coupled to said battery module, said voltage detecting circuit, said current detecting circuit and said switch, and configured to control said battery module to output electrical power to said power cord according to the first trigger signal, and to control said switch to make electrical connection between said power cord and said current detecting circuit according to the second trigger signal.

2. The DC uninterruptible power supply system as claimed in claim 1, wherein, for each of said uninterruptible power supply devices, said current detecting circuit is further configured to generate a third trigger signal upon detecting that a second current flowing through said switch is greater than a third preset value, said control unit being further configured to control said switch to break electrical connection between said power cord and said current detecting circuit according to the third trigger signal.

3. The DC uninterruptible power supply system as claimed in claim 2, wherein said current detecting circuit is further configured to, when said switch makes electrical connection between said power cord and said current detecting circuit, generate a fourth trigger signal upon detecting that the first current flowing in said power cord of said another one of said uninterruptible power supply devices reaches a fourth preset value, said control unit being further configured to control said switch to break electrical connection between said power cord and said current detecting circuit according to the fourth trigger signal.

4. The DC uninterruptible power supply system as claimed in claim 1, wherein said current detecting circuit is further configured to, when said switch makes electrical connection between said power cord and said current detecting circuit, generate a third trigger signal upon detecting that the first current flowing in said power cord of said another one of said uninterruptible power supply devices reaches a third preset value, said control unit being further configured to control said switch to break electrical connection between said power cord and said current detecting circuit according to the third trigger signal.

5. A direct-current (DC) uninterruptible power supply device disposed to receive input from a DC power source for supply of electrical power to a load, comprising:
  a power cord to be coupled between the load and the DC power source for transmitting a first current from the DC power source to the load;
  a battery module coupled to said power cord for receiving and storing electrical power from the DC power source;
  a voltage detecting circuit coupled to said power cord and configured to generate a first trigger signal upon detecting that a voltage of the DC power source is lower than a first preset value;
  a current detecting circuit to be coupled to an external power cord and configured to generate a second trigger signal upon detecting that a current flowing in the external power cord is smaller than a second preset value;
  a power-cord switch coupled between said power cord and said current detecting circuit, and configured to make or break electrical connection between said power cord and said current detecting circuit; and
  a control unit coupled to said battery module, said voltage detecting circuit, said current detecting circuit and said power-cord switch, and configured to control said battery module to output electrical power to said power cord according to the first trigger signal, and to control said power-cord switch to make electrical connection between said power cord and said current detecting circuit according to the second trigger signal.

6. The DC uninterruptible power supply device as claimed in claim 5, wherein said battery module includes:
  a battery unit;
  a charging circuit coupled between said power cord and said battery unit for receiving electrical power from the DC power source and charging said battery unit; and
  a discharging circuit coupled between said power cord and said battery unit for outputting electrical power from said battery unit to said power cord;
  wherein said control unit controls said battery unit to output electrical power to said discharging circuit according to the first trigger signal.

7. The DC uninterruptible power supply device as claimed on claim 6, wherein said charging circuit includes a DC-DC converter coupled to said power cord, and a charge switch configured to make or break electrical connection between said DC-DC converter and said battery unit, said DC-DC converter being configured to convert the voltage from the DC voltage source into a rating voltage of said battery unit, and to charge said battery unit via said charge switch.

8. The DC uninterruptible power supply device as claimed in claim 6, wherein said discharging circuit includes a linear regulator coupled to said battery unit, and a discharge switch configured to make or break electrical connection between said linear regulator and said power cord, said linear regulator being configured to adjust a voltage outputted by said battery unit to have a magnitude substantially the same as that of the voltage from the DC power source, and to output the voltage adjusted thereby to said power cord via said discharge switch.

9. The DC uninterruptible power supply device as claimed in claim 6, wherein said control unit includes a battery management module coupled to said battery unit, and a controller coupled to said battery management module, said voltage detecting circuit, said current detecting circuit, and said power-cord switch, said controller being configured to control output of electrical power by said battery unit via said battery management module according to the first trigger signal, and to control said power-cord switch to make electrical connection between said power cord and said current detecting circuit according to the second trigger signal.

10. The DC uninterruptible power supply device as claimed in claim 5, wherein said current detecting circuit is further configured to detect a second current flowing to the external power cord via said power cord, and to generate a third trigger signal upon detecting that the second current is greater than a third preset value, said control unit being further configured to control said power-cord switch to break electrical connection between said power cord and said current detecting circuit according to the third trigger signal.

11. The DC uninterruptible power supply device as claimed in claim 10, wherein said current detecting circuit is further configured to, when said power-cord switch makes electrical connection between said power cord and said current detecting circuit, generate a fourth trigger signal upon detecting that the current flowing in the external power cord reaches a fourth preset value, said control unit being further configured to control said power-cord switch to break electrical connection between said power cord and said current detecting circuit according to the fourth trigger signal.

12. The DC uninterruptible power supply device as claimed in claim 5, wherein said current detecting circuit is further configured to, when said power-cord switch makes electrical connection between said power cord and said current detecting circuit, generate a third trigger signal upon detecting that the current flowing in the external power cord reaches a third preset value, said control unit being further configured to control said power-cord switch to break electrical connection between said power cord and said current detecting circuit according to the third trigger signal.

* * * * *